United States Patent [19]

Elsässer

[11] Patent Number: 4,648,110
[45] Date of Patent: Mar. 3, 1987

[54] CIRCUIT ARRANGEMENT FOR A VOICE-CONTROLLED HANDS-FREE TELEPHONE FACILITY

[75] Inventor: Martin Elsässer, Hemmingen, Fed. Rep. of Germany

[73] Assignee: International Standard Electric Corporation, New York, N.Y.

[21] Appl. No.: 715,145

[22] Filed: Mar. 22, 1985

[30] Foreign Application Priority Data

Mar. 31, 1984 [DE] Fed. Rep. of Germany ....... 3412111

[51] Int. Cl.⁴ .............................................. H04M 1/60
[52] U.S. Cl. .................................... 379/390; 379/388
[58] Field of Search ............... 179/81 B, 100 L, 81 A, 179/81 R, 170.2, 170.4, 170.6

[56] References Cited

U.S. PATENT DOCUMENTS

| | | | |
|---|---|---|---|
| 3,100,818 | 8/1963 | Carter | 179/81 B |
| 3,659,050 | 4/1972 | Carlsson et al. | 179/81 B |
| 3,772,472 | 11/1973 | Blomberg | 179/100 L |
| 4,056,696 | 11/1977 | Meyerle et al. | 179/100 R |
| 4,396,799 | 8/1983 | Franzen et al. | 179/81 B |
| 4,497,980 | 2/1985 | Gorman et al. | 179/81 B |
| 4,513,177 | 4/1985 | Nishino et al. | 179/81 B |
| 4,558,178 | 12/1985 | Yasuda et al. | 179/2 E |

OTHER PUBLICATIONS

"Voice Controlled Handsfree Subset for the Intermat Range", M. Slawik et al., Electrical Communication, vol. 53, No. 4, 1978, pp. 301-306.

Primary Examiner—Gene Z. Rubinson
Assistant Examiner—R. Vaas
Attorney, Agent, or Firm—John T. O'Halloran; Thomas F. Meagher

[57] ABSTRACT

A voice-controlled hands-free facility contains a microphone, an internal and an external loudspeaker, and two series combinations of an input amplifier (EV), a variable attenuator (DR), and an output amplifier (AV), one for the send path and one for the receive path, and is controlled by a voice control unit (SS) connected to the output (E) of the input amplifier (EV), to the output (D) of the variable attenuator (DR), and, by a line (L), to an input of the variable attenuator (DR).

To permit the hands-free facility to be switched from a single-part mode of operation to a two-part mode, the output (E) of the input amplifier (EV) in the send path and/or the receive path is connected to the output (A) of the output amplifiers (AV) through a bypass device (BP) and a switching unit (T).

3 Claims, 1 Drawing Figure

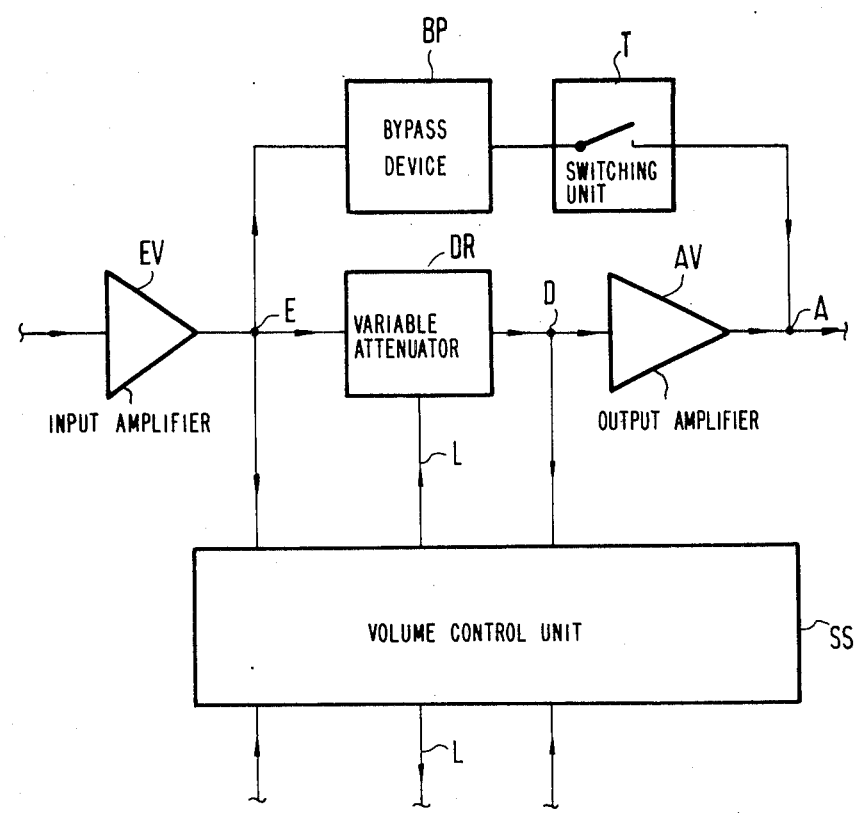

CIRCUIT ARRANGEMENT FOR A VOICE-CONTROLLED HANDS-FREE TELEPHONE FACILITY

BACKGROUND OF THE INVENTION

The present invention relates to a circuit arrangement for a voice-controlled hands-free facility connectable via a hybrid circuit to a subscriber facility comprising a microphone, an internal and an external loudspeaker, and two series combinations of an input amplifier, a variable attenuator, and an output amplifier, one for the send path and one for the receive path, with the output of the input amplifier and the output of the variable attenuator connected to a voice control unit coupled to the variable attenuator by a line.

Voice-controlled hands-free facilities (cf., inter alia, M. Slawik and H. Wiedmann: "Die neue sprachgesteuerte Freisprecheinrichtung für die Produktfamilie INTERMAT", Elektrisches Nachrichtenwesen, Vol. 53, No. 4, 1978) give the user greater freedom of movement during a telephone conversation because, instead of the transmitter and receiver capsules of the handset, a microphone and a separate loudspeaker are provided.

However, hands-free facilities have the disadvantage that a signal reproduced by the loudspeaker follows the air path and is received by the microphone, and that a coupling path exists between the microphone and the loudspeaker in the form of sidetone path of the hybrid, so that a closed loop is formed; as a result, a singing tone may be produced due to feedback.

If the loudspeaker and the microphone are accommodated in the housing of the telephone set, i.e., if the hands-free facility is a single-part facility, the short distance between the mircophone and the loudspeaker results in a low air-path attenuation. An increased voice-controlled swing is thus required to avoid feedback. This hard voice-control behavior has the disadvantage that, in the presence of loud ambient noise, one path may be permanently switched on, whereby speech contact is broken. Furthermore, duplex operation, which is usual in normal telephone communication, is no longer possible because the associated transmit path is not switched on until the voice has reached a certain level.

If, instead of the internal loudspeaker, an external loudspeaker is connected to the telephone set, the considerably higher air-path attenuation cannot be turned to account because of the necessary hard voice control for operation with the internal loudspeaker.

SUMMARY OF THE INVENTION

The technical function of the circuit arrangement according to the invention is to make a hands-free facility switchable from a single-part mode, i.e., operation with an internal loudspeaker, to a two-part mode, i.e., operation with an external loudspeaker.

The invention is characterized in that, in the send path and/or the receive path, the output of the input amplifier is connected to the output of the output amplifier through a bypass device and a switching unit.

A principal advantage of the invention is that, in the "two-part mode", the bypass device reduces the closed-circuit attenuation of the variable attenuator, so that speech contact is improved considerably.

Further advantageous aspects of the subject matter of the invention are claimed in the subclaims.

BRIEF DESCRIPTION OF THE DRAWING

An embodiment of the invention will now be explained with reference to the accompanying drawing.

DESCRIPTION OF THE PREFERRED EMBODIMENT

As both transmission paths consist of a series combination of an input amplifier EV, a variable attenuator DR, and an output amplifier AV, and have a microphone connected to one end and a loudspeaker to the other, only one direction of transmission is illustrated in the single FIGURE for the sake of clarity.

A voice control unit SS is connected to the output E of the input amplifier EV, to the output D of the variable attenuator DR, and, by a line L, to an input of the variable attenuator DR. Between the output E of the input amplifier EV and the output A of the output amplifier AV, a bypass device BP and a switching unit T are connected in series.

The voice control unit SS controls the gain in the two transmission paths as a function of the voice level. When a subscriber is speaking, the voice signal delivered by the microphone is fed through the input amplifier EV to the voice control unit SS, which derives a control signal for the variable attenuator DR. This control signal opens the variable attenuator DR of the send path from a predetermined level, so that the voice signal will be transmitted to the output amplifier AV. An increase in gain in the send path causes a corresponding decrease in gain in the receive path. An additional signal is applied to the voice control unit SS from the output D of the variable attenuator DR in the send path. By this signal, a hysteresis of the voice control behavior is achieved, and clipping of end syllables is largely avoided.

To use the single-part hands-free facility, the bypass device BP is disconnected from the send path and/or the receive path by the switching unit T. Because of the low air-path attenuation between the microphone and the internal loudspeaker, the voice-controlled swing must be as high as possible to provide a sufficient singing margin. This hard voice control leads to one path being switched on and the other being switched off, which necessitates high speech discipline, because only one subscriber can speak at a time.

To reduce the aforementioned disadvantages, instead of the internal loudspeaker, an external loudspeaker can be connected to the circuit ("two-part mode"). According to the invention this is done by connecting the output E of the input amplifier EV to the output A of the output amplifier AV via the bypass device BP. The bypass BP applies to the output A of the output amplifier AV a voice signal attenuated by a presettable value, so that the high closed-circuit attenuation of the variable attenuator DR, which is caused by the high voice-controlled swing, is reduced. Since the output signal of the bypass device BP is applied to the output A of the output amplifier AV, the voice control unit SS, which was adjusted for the single-part mode, is not affected.

Such a bypass device BP may consist of a resistor in series with a capacitor and can be inserted both in the send path and in the receive path; it must only be ensured that the singing limit at maximum volume, which depends on the distance between the microphone and the external loudspeaker, is not exceeded.

By the use of the bypass device BP, a simple, low-cost switchover from the single-part hands-free mode to the two-part mode is implemented. In the two-part mode, the high speech discipline of the single-part mode is not necessary, because even when one party is speaking, the voice signals from the other party are switched through and received via the bypass.

If the single-part mode is desired again, the bypass device BP will be disconnected from the send path and/or the receive path by the switching unit T, so that the initial state is restored in a very simple manner.

I claim:

1. Circuit arrangement for a voice-controlled hands-free facility, connected via a hybrid circuit to a subscriber facility, comprising a microphone, an internal and an external loudspeaker, and two series combinations of an input amplifier (EV), a variable attenuator (DR), and an output amplifier (AV), one series combination for each of two transmission paths of said subscriber facility, with an output (E) of each of said input amplifiers (EV) and an output (D) of each of said variable attenuators (DR) connected to a voice control unit (SS) coupled to provide control signals to each of said variable attenuators (DR) (L), characterized in that in at least one of said two transmission paths, said output (E) of said input amplifier (EV) is connected to an output (A) of said output amplifier (AV) through a bypass device (BP) and a switching unit (T).

2. A circuit arrangement as claimed in claim 1, characterized in that, in said at least one of said two transmission paths, in response to the turning on of the internal loudspeaker, said switching unit (T) disconnects said bypass device (BP) from said output of said output amplifier.

3. A circuit arrangement as claimed in claim 1, characterized in that in said at least one of said two transmission paths, said bypass device (BP) consists of a resistor in series with a capacitor, so that said bypass device attenuates a signal output (E) from said input amplifier (EV) by a presettable value.

* * * * *